(No Model.) 2 Sheets—Sheet 1.

C. AHRENS.
RUNNING GEAR FOR VEHICLES.

No. 324,207. Patented Aug. 11, 1885.

Attest
Chas. Anderson
E. C. Pollock

Inventor
Christopher Ahrens
By John W. Hill
Attorney (No Model.) 2 Sheets—Sheet 2.

C. AHRENS.
RUNNING GEAR FOR VEHICLES.

No. 324,207. Patented Aug. 11, 1885.

Attest
Chas. Anderson.
E. C. Pollock.

Inventor
Christopher Ahrens
By John W. Hill
Attorney

UNITED STATES PATENT OFFICE.

CHRISTOPHER AHRENS, OF CINCINNATI, OHIO.

RUNNING-GEAR FOR VEHICLES.

SPECIFICATION forming part of Letters Patent No. 324,207, dated August 11, 1885.

Application filed April 6, 1885. (No model.)

*To all whom it may concern:*

Be it known that I, CHRISTOPHER AHRENS, of Cincinnati, in the county of Hamilton and State of Ohio, have invented certain new and useful Improvements in Running-Gears for Wheeled Vehicles, of which the following is a specification.

My invention relates to the forward running-gear of wheeled vehicles, and especially of steam fire-engines, and has for its object the construction of the equalizing-frame and springs in such a manner that variations in the surface of the ground over which such vehicles are run shall not be calculated to twist and strain the engine-frame, as in the running-gear previously employed for this purpose, all of which will be fully explained hereinafter.

Figure 1:
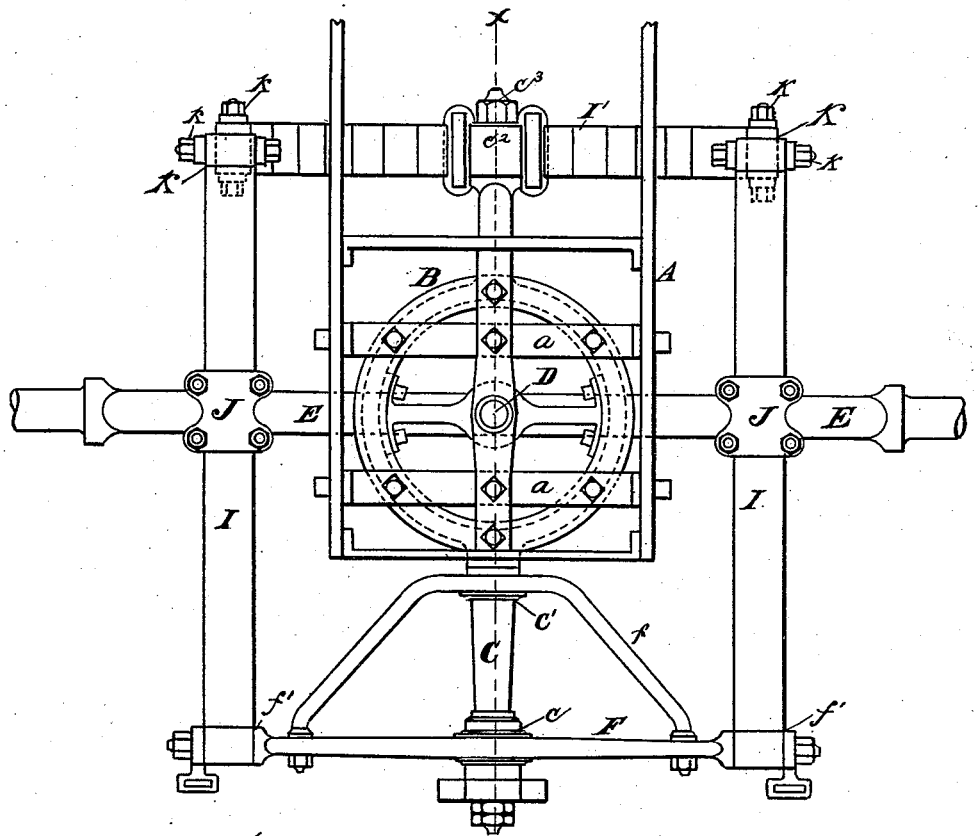
Figures 4, 5:
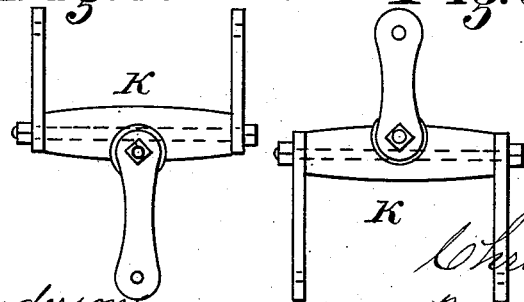
Figure 2:
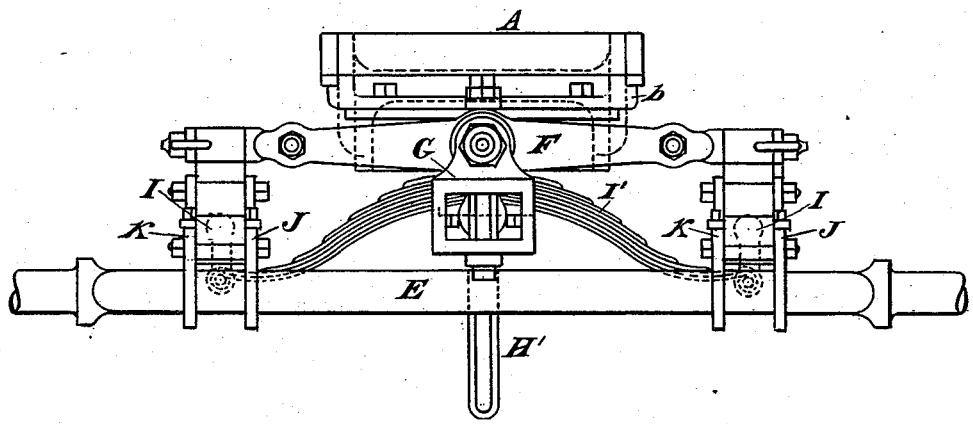
Figure 3:
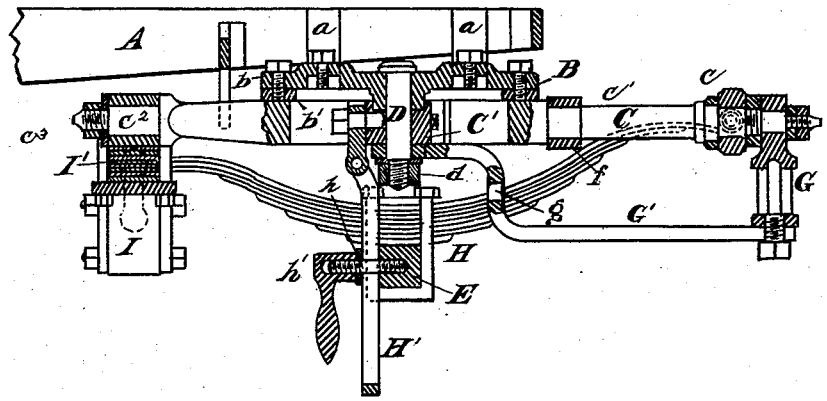

In the accompanying drawings, Figure 1 is a plan view of my improvement; Fig. 2, a transverse elevation thereof; Fig. 3, a longitudinal section on line $x\,x$ of Fig. 1, and Figs. 4 and 5 are detached views of the equalizing-link on an enlarged scale.

Similar letters of reference indicate similar parts.

A is the frame of a steam fire-engine.

B is the "fifth-wheel," the upper half, $b$, of which is secured to the frame A by the cross-bars $a\,a$, and the lower half, $b'$, being formed a part of or attached to the reach C.

D is the king-bolt, upon which the front running-gear turns.

E is the axle for the front wheels.

F is an equalizing-bar, provided with the brace $f$, which turns upon the journals $c$ and $c'$ of the reach C.

G is a socket hung to the reach C, for the reception of the tongue of the vehicle, (not shown,) the rear end of which enters the hole $g$ in the brace G', the rear end of which brace is pivoted to the king-bolt D, and retained in position by the nut and washer $d$ at the lower end of the king-bolt.

The parts C, $b'$, G, and G' are rigidly secured together, and have no other motion than that due to the oscillation of the lower half of the fifth-wheel B. Similarly, the frame A, cross-bars $a\,a$, and upper half, $b$, of the fifth-wheel are rigidly secured together, and have only the motion of the fifth-wheel.

H is a link suspended from the under side of the reach C, to limit the vertical motion of the axle E; and H', another link, suspended from the cross-brace C' of the reach C, through which projects the stud $h$. At one end the stud $h$ is secured to the axle E, and at the other provided with the lever-nut $h'$, whereby the axle E may be rigidly secured in any position in the link H by tightening the nut $h'$ against the link H'—as, for instance, when a steam fire-engine is "working" at a fire—to prevent the vibration of the forward end of the machine on the front running-gear, which would otherwise occur.

I I are the side springs, and I' the back spring, which, in conjunction with the equalizing-bar F and the connecting-links, form the equalizing-frame. The front ends of springs I are attached to and turn upon the journals $f'$ of the equalizing-bar F. The springs I at mid-length are rigidly secured to the axle E by the binding plates and bolts J, and at their rear ends connected with the extremities of the back spring, I', by the equalizing-links K. The rear ends of side springs, I, and both ends of back spring, I', are journaled to the links K by the cross-bolts $k\,k$. The back spring, I', at mid-length, is mounted and turns upon the journal $c^2$ of the reach C, and retained thereon by the nut and washer $c^3$.

It will be observed that the extremities of the three springs are flexibly connected either to the equalizing-bar F, or together, by means of bearings or eyes formed on the ends of the springs and the journals $f'\,f'$ and $k\,k$, and that considerable independent motion of each side spring is possible within the limits of elasticity, and that the mounting of back spring, I', at its mid-length upon the journal $c^2$ enables it to perform the double function of a spring and an equalizing-bar, whereby an excess of strain upon either side spring I—as, for instance, when one wheel strikes an obstruction or drops into a rut—is absorbed in part by the back spring, I', acting as a spring, and by the opposite side spring I through the back spring, I', acting as an equalizing-bar, and through the equalizing-bar F. The mounting of the springs on journal-bearings permits of a transmission of strains from side to side of the running-gear without straining or twisting the rigid portion A, a, or b of the construction, or of straining the reach C and such parts as are rigidly connected to it.

The equalizing-frame is substantially a rectangle, three sides of which consist of the yielding members I I and I', and the fourth side of the stiff member F, and the transmission of strains from one side to the other through the members I' or F is through the relatively rigid reach C, upon one end of which the equalizing-bar F is mounted, and upon the other end the back spring, I', is mounted.

Although I have specially adapted my improvement to steam fire-engines, it is evident that its application or utility is not limited to steam fire-engines alone.

Having described my invention, what I claim is—

1. An equalizing-frame for the forward running-gear of wheeled vehicles, consisting of the yielding members I I and I' and the stiff member F, in combination with the relatively rigid member C, upon which the members I' and F are mounted in journal-bearings, substantially as described.

2. The combination of the reach C, having secured to it the lower half of the fifth-wheel B, and having journal-bearings $c\ c^2$ upon the opposite ends thereof, and the equalizing-bar F and back spring, I', arranged to turn upon said journal-bearings, for the purpose and substantially as described.

3. In an equalizing-frame for wheeled vehicles, substantially as described, the equalizing-bar F, provided with the brace $f$, and having journal-bearings $f'$ at both extremities, in combination with the reach C, provided with journal-bearings $c\ c'$, upon which bearings the parts F $f$ turn, for the purpose described.

In testimony whereof I have signed my name to the foregoing specification in the presence of two subscribing witnesses.

CHRISTOPHER AHRENS.

Witnesses:
F. A. DOSSMANN,
B. HUESMAN.